Patented May 16, 1939

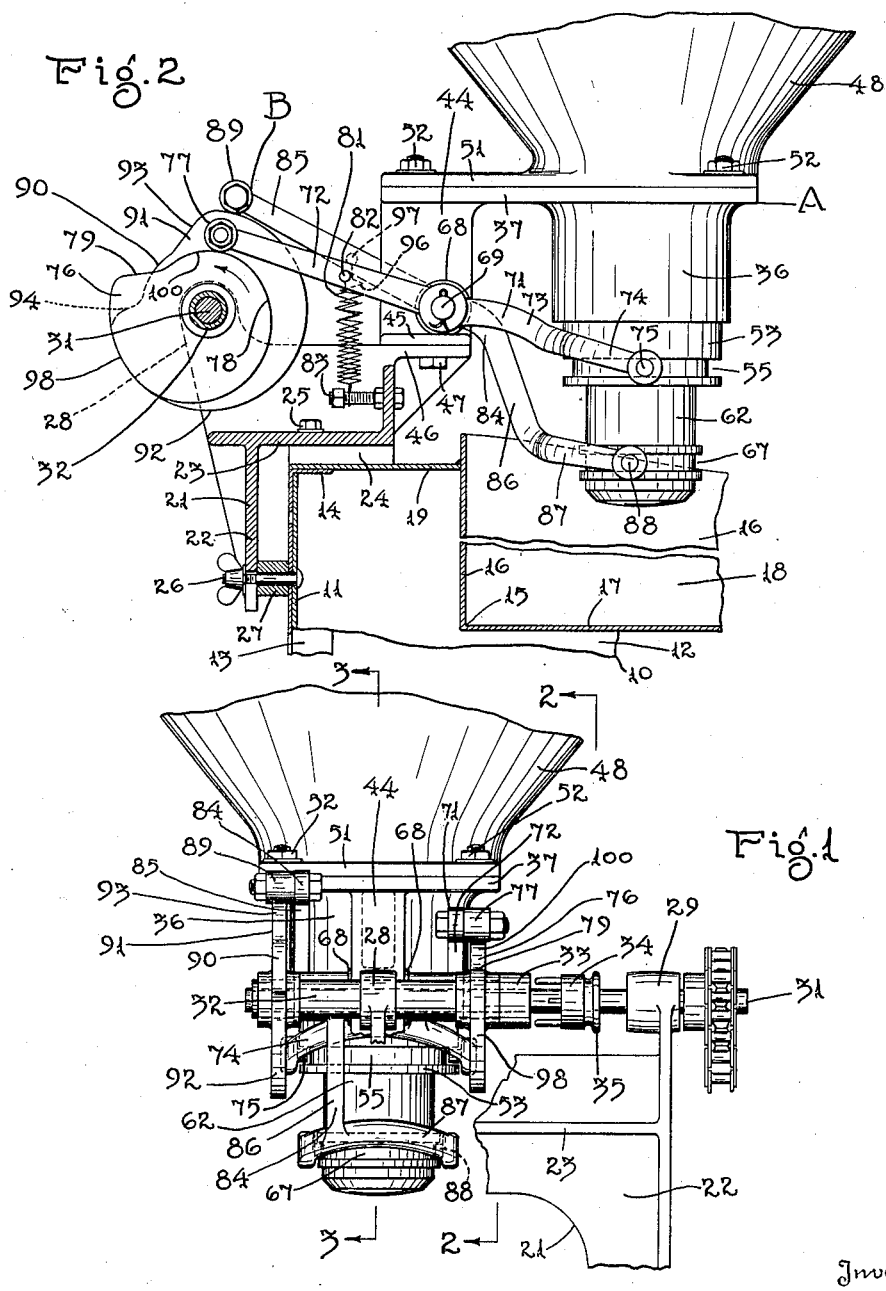

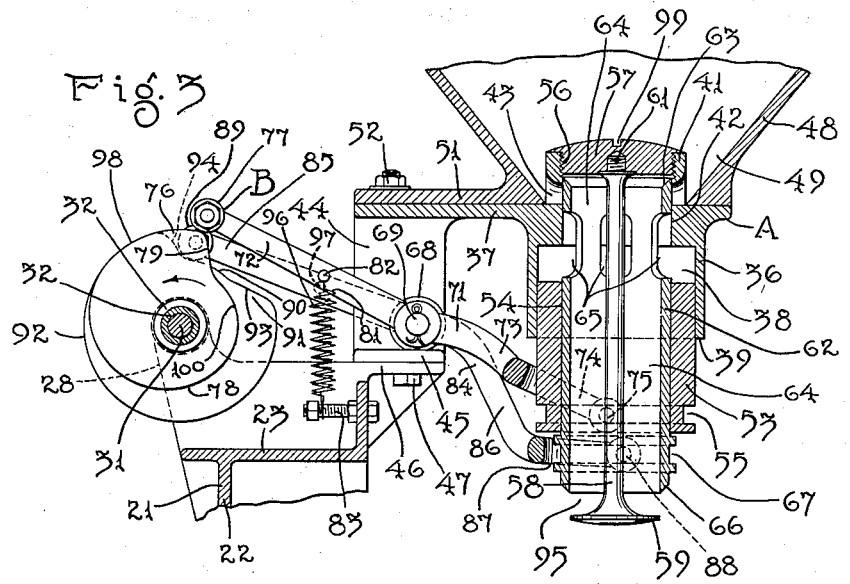
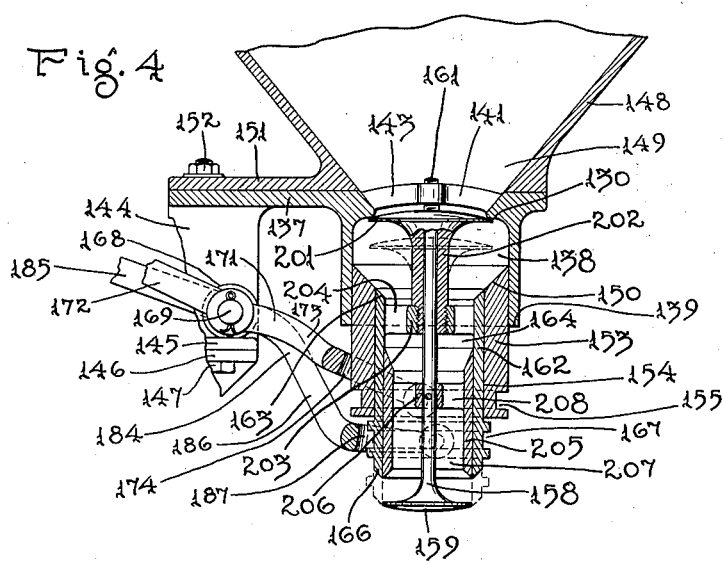

2,158,463

UNITED STATES PATENT OFFICE 2,158,463

DOUGH CUTTER

Alexander S. T. Lagaard, Minneapolis, Minn., assignor to Dough-King, Inc., Minneapolis, Minn., a corporation of Minnesota Application January 31, 1938, Serial No. 187,912

14 Claims. (Cl. 107—14)

My invention relates to dough cutters and particularly to cutters used for cutting annular formations of dough, such as doughnuts and the like.

An object of the invention resides in providing a dough cutter which will be simple in construction and positive in operation.

Another object of the invention resides in providing a dough cutter in which accurately measured quantities of dough can be repeatedly severed from the mass of dough.

A still further object of the invention resides in providing a dough cutter constructed with a cylinder and with a valve mechanism for controlling the entry of the dough in to the cylinder and other valve mechanism for controlling the extrusion of the dough from the cylinder and in further providing a single operating member for simultaneously operating said valve mechanisms in alternation.

Another object of the invention resides in providing a dough cutter in which the dough is uniformly drawn in into the cylinder and uniformly extruded therefrom.

An object of the invention resides in providing a sleeve for the above noted purpose and in arranging said sleeve concentric with the said cylinder.

Another object of the invention resides in utilizing an annular piston disposed within said cylinder and slidably receiving said sleeve.

A still further object of the invention resides in constructing the piston so that operating mechanism therefor may be attached to the same at the lowermost portion thereof and preferably at a locality below the lower end of the cylinder.

Another object of the invention resides in constructing the sleeve so that the operating mechanism therefor may be connected to the lower portion of the same and preferably below the lower end of the piston.

A feature of the invention resides in constructing the valve mechanisms, the operating mechanisms and the piston so that the parts may be easily and readily withdrawn from the cylinder and disassembled.

Other objects of the invention reside in the novel combination and arrangement of parts and in the details of construction hereinafter illustrated and/or described.

In the drawings:

Fig. 1 is an elevational view of a portion of a doughnut machine illustrating an embodiment of my invention applied thereto.

Fig. 2 is an elevational sectional view taken on line 2—2 of Fig. 1.

Fig. 3 is a view, similar to Fig. 2, taken on line 3—3 of Fig. 1.

Fig. 4 is a view, similar to Fig. 3, of a modification of the invention.

My invention resides in a dough cutter which may be applied to any type of doughnut machine. This cutter is particularly applicable to a machine such as shown in the co-pending application of Peter J. Toews, Serial Number 114,395, filed December 5, 1936 for Doughnut machines. Since this invention is directly associated with a portion only of the structure shown in said application, so much thereof as will be needed to describe the present invention will be shown, reference being had to the said application for patent for further details of the remainder of the doughnut machine.

The doughnut machine, with which the invention is illustrated, comprises a case 10 which is constructed with a rear wall 11, side walls 12 and a front wall, not shown. These walls are attached to angle iron legs 13, one of which is shown in Fig. 2. The upper ends of these walls have secured to them angle iron frame members, the member attached to wall 11 being indicated by the reference numeral 14. Supported in the case 10 is a pan 15, which is constructed with vertical walls 16 and a bottom 17 which form a way 18 along which the cooking liquid travels. The way 18 is provided with a number of reaches which have not been shown in this application and the doughnut cutter forming a feature of the invention is attached to the machine in such a manner as to discharge the cut dough in one of the reaches of the way 18. The uppermost portion of the pan 15 has attached to it a table 19 which is supported on the frame members 14 and secured thereto. The cooking liquid is progressed through the way 18 of pan 15 by means of an impeller, not shown, which causes circulation of the cooking liquid through the machine and which causes the doughnuts deposited by the cutter to be progressed through the machine at the proper rate of speed. At a suitable position in the way 18 the doughnuts are turned over and at the end of the way the finished doughnuts are removed from the machine, all as disclosed in said application for patent of Peter J. Toews.

The case 10 has attached to it a bracket 21 which is constructed with a flange 22 extending along the rear wall 11 of said case and with a base 23 overlying the table 19 and frame member 14. The base 23, of bracket 21, rests upon a bar 24 overlying table 19 and is secured to the said bar and frame member by means of bolts 25. The flange 22, of bracket 21, is secured to the leg 13 of case 10 by means of a bolt 26 and a spacer 27. This bracket supports the cutter proper, which is indicated in its entirety by the reference numeral A, and the operating mechanism B by means of which said cutter is operated.

Formed on the base 23 are two bearings 28 and 29, in which is journaled a shaft 31. This shaft is driven in any suitable manner from the transmission of the device which is situated below the pan 15 and which has not been illustrated in the drawings. It can readily be comprehended that any drive means for rotating the shaft may be provided. Rotatably mounted on the shaft 31 is a sleeve 32 which carries all of the operating parts of the operating mechanism B which effect movement of the parts of the cutter and which will be presently more fully described. Sleeve 32 is constructed with a jaw clutch member 33, which is adapted to be engaged with another jaw clutch member 34 splined to the shaft 31. Any desired construction may be used for operating the jaw clutch member 34, a knob 35 being shown in the drawings.

The cutter A, as best shown in Fig. 3, comprises a cylinder 36 constructed with a flange 37 issuing laterally from the same near its upper end. The cylinder 36 is provided with a cylindrical bore 38 forming a cylinder chamber into which the dough is received and which is disposed with its axis vertical. The lower end of the cylinder 36, which is designated at 39 is open and the cylindrical bore 38 is exposed at its lower end to the exterior.

The upper end of the cylinder 36 is constructed with a tube 41 which is integral therewith and which extends upwardly beyond the flange 37. This tube is provided with a bore 42, smaller in diameter than the bore 38 which extends down into the cylinder 36 and past the flange 37. In the protruding portion of the tube 41 are provided a number of inlet ports 43 by means of which dough may enter the said tube and eventually be received within the cylinder chamber 38 of cylinder 36.

The flange 37 is constructed with a leg 44 which is provided with a foot 45 at the lower portion of the same. This foot rests upon a support 46 formed on the base 23 of bracket 21. These parts are secured together by means of bolts 47.

Superimposing the cylinder 36 is a hopper 48 which is constructed with a throat 49 through which the dough, contained in the hopper, is directed into the ports 43. At the lowermost portion of the hopper 48 the same is constructed with a flange 51 which is bolted to the flange 37 of cylinder 36 by means of a bolt 52.

Slidably mounted in the bore 38, of cylinder 36, is an annular piston 53. This piston fits closely within the walls of cylinder 36 and is provided with a bore 54 of the same diameter as the bore 42 and which is concentric therewith. The piston 53 is provided at its extreme lower end with a groove 55, by means of which the same may be reciprocated and is adapted to move in a vertical direction by means to be presently described in detail.

The upper end of the tube 41 is internally threaded at 56 to receive a cap 57. This cap has issuing from it a spindle 58 which terminates at the lower end of the same in a head 59. The spindle 58 is constructed with a threaded end 61 which screws into the cap 57 at the center of the same. By means of this construction, the head 59 is removably mounted with respect to the cylinder 36. The head 59 is concentrically arranged with respect to the bore 54 and the bore 38.

Slidably mounted in the bore 54, of piston 53 and in the bore 42 of the tube 41, is a sleeve 62. This sleeve is provided at its upper end with a beveled edge 63 which forms a valve member cooperating with the ports 43 to control the flow of dough into the interior of the cylinder 36. Sleeve 62 is provided with an internal passageway 64 through which dough may pass when the edge 63 of said sleeve is below the uppermost edges of the ports 43. Formed in the sleeve 62, near the upper portion of the same, are a number of ports 65, similar to the ports 43. These ports are arranged to communicate with the cylinder chamber 38 so that, when the piston 53 is operated, dough may be drawn into the same from the passageway 64 and returned to said passageway. It will be noted that the ports 65 are of sufficient length so that the cylinder chamber 38 is at all times in communication with the passageway 64.

The lower end of the sleeve 62 is constructed with a beveled edge 66 which is similar to the edge 63 but which is beveled in the opposite direction. This edge is, when in its uppermost position, spaced from the head 59 to form a discharge opening 65 therebetween and is adapted to cooperate with the head 59 to control the extrusion of dough from said opening. The beveled edge 66 and the head 59 form a die mechanism by means of which the extrusion of dough from the cutter is controlled so that the dough is formed into annular formations which are severed from the mass when the sleeve 62 is lowered to a position below the die-head 59. For operating the said sleeve, a groove 67 is provided in the lowermost portion of the same and immediately above the edge 66 which groove serves the same purpose as the groove 55.

The piston 53 is reciprocated by a construction, best shown in Figs. 1 and 2. The leg 44, of cylinder 36, is constructed with a boss 68 which projects outwardly therefrom on both sides. This boss is bored to receive a shaft 69. Pivoted on this shaft is a lever 71 which is constructed with two arms 72 and 73. The arm 73 is forked, as designated at 74, and is provided at its ends with pins 75 which enter the slot 55 in piston 53. As the lever 71 is oscillated, piston 53 is raised and lowered.

Mounted on the sleeve 32 is a cam 76. This cam travels with the sleeve 32 and is adapted to engage a roller 77 on the end of the arm 72 of lever 71. The cam 76 is constructed with a gradually outwardly spiralling cam surface 78 and with a rapidly inwardly spiralling cam surface 79. The said cam is further formed with cylindrical surfaces 99 and 100 between the surfaces 78 and 79. The shaft 31 is driven in the direction shown by the arrow in Fig. 2. When the roller 77 engages the cam surface 78, dough is gradually drawn into the cylinder chamber 38. When the roller engages the cam surface 79, the roller 77 moves inwardly toward the shaft 31 and the dough is rapidly extruded from the cylinder chamber 38. Movement of the roller 77 inwardly is accomplished by means of a tension coil spring 81 which is hooked to a pin 82 on the arm 72 of lever 71 and to a stud 83 issuing from the bracket 21.

The sleeve 62 is operated in a manner similar to the piston 53. Pivoted on the shaft 69 is a lever 84 which is constructed with two arms 85 and 86. The arm 86 is forked, as designated at 87, and is provided at its end with pins 88 which engage the groove 55 of sleeve 62. The arm 85 of lever 86 is provided with a roller 89 which is adapted to engage a cam 91. Cam 91 is constructed with a circular cam surface 92, a gradually outwardly spiralling cam surface 93, and a rapidly inwardly spiralling cam surface 94. The cam 91 also has a cylindrical surface 90 between the surfaces 94 and 93. When the roller 89 engages the cam surface 93, the sleeve 62 is moved downwardly in a manner to close the opening 95 formed between the beveled edge 66 of said sleeve and the head 59. When the roller rides on the cam surface 92, the sleeve 62 is maintained in such position. When the roller 89 engages the cam surface 93, the sleeve 62 is moved upwardly to become disengaged from the head 59, whereby the opening 95 is again formed for the extrusion of dough between said sleeve and head. Such movement is procured by means of a tension coil spring 96, which is attached to a pin 97, similar to the pin 82, and to a stud, similar to the stud 83, which has not been shown in the drawings. When the roller rides on the cam surface 90, sleeve 62 is momentarily maintained in its uppermost position to cause the opening 95 to persist for a short period of time.

The operation of my invention is as follows: Assume the hopper 48 to be filled with dough and the sleeve 62 to be lowermost and the piston 53 uppermost, as shown in Fig. 2. Rotation of the shaft 31 and sleeve 32 in the direction indicated by the arrow causes the sleeve 62 to remain in its lowermost position and the cam roller 77 to climb the cam surface 78. Due to the length of the sleeve 62, when the opening 95 is closed, ports 43 are open. As the lever 71 oscillates, piston 53 is drawn downwardly and dough is drawn into the cylinder chamber 38 of cylinder 36. The dough, in traveling into this chamber, passes through the ports 43, through the passageway 64 and through the ports 65 and into said cylinder chamber. Travel of dough continues until the roller 77 reaches the cylindrical surface 98 of cam 76. The roller 89 now travels inwardly along the cam surface 94, being operated by spring 96 and moves the sleeve 62 upwardly. The parts are now as shown in Fig. 3. As the sleeve 32 continues to rotate, roller 77 follows along the cam surface 79 and the piston 53 is moved rapidly upward. This causes the dough, contained within the annular cylinder chamber 38, to be extruded back through the ports 65 along the passageway 64 and to be finally extruded through the opening 95 in annular formation. During such movement roller 89 is traveling along cam surface 90. As soon as cam roller 89 engages cam surface 93 the sleeve 62 is immediately lowered and the dough formation cut off and freed from the mass of dough within the passageway 64. The dough formation then drops from the cutter and is deposited into the cooking liquid within the receptacle 15. It will be noted that roller 89 travels along the cam surface 99, while the dough is being extruded from the cylinder chamber 38. In this manner the opening 95 is maintained while dough is being extruded. After the forming and severing of each portion of the dough, the operations are repeated and further portions of dough cut off and formed in the same manner.

When it is desired to clean the machine the springs 81 and 96 are first removed and thereafter the bolts 47 disconnected. The entire hopper and cutter may now be disengaged from the machine. As soon as the cam rollers 77 and 89 become free from the cams from which they operate, the pins 75 and 88 may be slid out of the grooves 55 and 67, whereupon the sleeve 62 and piston 53 may be drawn longitudinally out of the device. By unscrewing the cap 57 through a screw driver slot 99, provided for the purpose, the said cap 57, spindle 58 and head 59 may also be removed from the device.

In Fig. 4 I have shown a modification of the invention in which the valve mechanism for controlling the dough into the cylinder chamber 38 is slightly different. Inasmuch as certain of the parts are identical in construction, the description thereof will not be repeated and the same reference numerals, preceded by the digit 1 will be used to designate corresponding parts.

In the form of the invention shown in Fig. 4 the tube 41 is dispensed with and a bridge 141 used in place thereof. This bridge provides openings 143 to either side of the same and through which dough may pass into the cylinder chamber 138. The sleeve 162 is, in this case, considerably shorter and constructed without ports. The upper end of the piston 153 may be beveled, as indicated at 150, or the same may be left square, if desired. Similarly the upper edge 163 of piston 162 may likewise be beveled or left square, if desired. The bridge 141 is tapped to receive the threaded end 161 of spindle 158 which carries the head 159 which cooperates with the beveled edge 166 of sleeve 162.

Formed at the upper end of the cylinder chamber 138 is a valve seat 130 which is adapted to be engaged by a valve 201 of the poppet type. This valve is mounted on a tubular valve stem 202 which is slidably mounted on the spindle 158. The valve stem 202 is screwed into a bridge 203 which is formed upon the interior of the sleeve 162 and which provides passageways 204 therein for bringing the cylinder chamber 138 into communication with the passageway 164 within said sleeve. Mounted within the sleeve 162, is a stationary tube 205 which is formed upon the interior with a bridge 206 attached to the spindle 158. This tube is constructed with a passageway 207 lying in continuation of the passageway 164. The bridge 206 is formed with passageways 208 which bring the passageway 164 into communication with the passageway 207.

The operation of this form of the invention is identical with that shown in Figs. 1, 2 and 3. Instead of the upper end of the sleeve 62 forming a sleeve valve, operating in conjunction with the ports 43, the valve 201 forms a poppet valve, operating in conjunction with the seat 130. The tube 205, within the sleeve 162, reduces the friction between the dough and the moving parts, when the sleeve is operated.

The advantages of my invention are manifest. By use of the annular piston, dough is uniformly drawn into the cylinder chamber from the hopper. By arranging the parts with the piston actuating means at the lower end of the piston, a construction is provided whereby the piston may be easily removed from the cylinder without difficulty. Likewise by arranging the sleeve with the operating mechanism at the lowermost end of the same, the sleeve can also be easily removed from the cutter. When the various parts are disassembled, the machine becomes extremely easy to clean.

Changes in the specific form of my invention, as herein disclosed, may be made within the scope of what is claimed without departing from the spirit of my invention.

Having described my invention, what I claim as new and desire to protect by Letters Patent is:

1. A dough cutter comprising a cylinder having a vertical cylinder chamber open at its ends, valve means at the upper end of the cylinder for controlling the flow of dough into the cylinder chamber, an annular piston within said cylinder and die means disposed within said piston projecting through the lower end of said cylinder and controlling the extrusion of dough from said cylinder chamber.

2. A dough cutter comprising a cylinder having a vertical cylinder chamber open at its ends, valve means at the upper end of the cylinder for controlling the flow of dough into the cylinder chamber, an annular piston within said cylinder, a reciprocable sleeve within said piston projecting downwardly therefrom and through the lower open end of said cylinder chamber and means cooperating with said sleeve for controlling the extrusion of dough from said cylinder chamber.

3. A dough cutter comprising a cylinder having a vertical cylinder chamber open at its ends, a support extending across the upper end of said cylinder and providing openings into the upper end of the cylinder chamber, a spindle attached to said support and extending downwardly through the lower end of the cylinder, an annular piston within said cylinder, a sleeve slidable within said piston and extending outwardly through the lower end of the cylinder and below said piston, a head on the lower end of said spindle adapted to control in conjunction with said sleeve the extrusion of dough from said cylinder chamber and valve means at the upper end of the cylinder chamber operated by said sleeve and controlling the flow of dough into said cylinder chamber.

4. A dough cutter comprising a cylinder having a vertical cylinder chamber open at its ends, a support extending across the upper end of said cylinder and providing openings into the upper end of the cylinder chamber, a spindle attached to said support and extending downwardly through the lower end of the cylinder, an annular piston within said cylinder, a sleeve slidable within said piston and extending outwardly through the lower end of the cylinder and below said piston, a head on the lower end of said spindle adapted to control in conjunction with said sleeve the extrusion of dough from said cylinder chamber, a valve seat formed at the upper end of said cylinder, a poppet valve slidable on said spindle and attached to said sleeve, said valve controlling the flow of dough into the upper end of the cylinder.

5. A dough cutter comprising a cylinder having a vertical cylinder chamber open at its ends, a support extending across the upper end of said cylinder and providing openings into the upper end of the cylinder chamber, a spindle attached to said support and extending downwardly through the lower end of the cylinder, an annular piston within said cylinder, a sleeve slidable within said piston and extending outwardly through the lower end of the cylinder and below said piston, a head on the lower end of said spindle adapted to control in conjunction with said sleeve the extrusion of dough from said cylinder chamber, said sleeve having a part movable past the openings at the upper end of the cylinder for controlling the flow of dough into the cylinder chamber and ports in said sleeve for bringing the interior thereof into communication with said cylinder chamber.

6. A dough cutter comprising a dough receptacle, a cylinder below said dough receptacle and having a vertical cylinder chamber open at its ends, valve means at the upper end of the cylinder for controlling the flow of dough into the cylinder chamber, an annular piston insertable into said cylinder chamber through the lower end of said cylinder, laterally extending means engaging the lower end of said piston at a locality below said dough receptacle for reciprocating the piston and means within said piston for controlling the extrusion of dough from said cylinder chamber and through said piston.

7. In a dough cutter comprising a cylinder having a vertical cylinder chamber open at its ends, valve means at the upper end of the cylinder for controlling the flow of dough into the cylinder chamber, an annular piston insertable into said cylinder chamber through the lower end of said cylinder, means engaging the lower end of said piston and disposed below said cylinder for reciprocating said piston and means within said piston for controlling the extrusion of dough from said cylinder chamber.

8. A dough cutter comprising a cylinder having a cylinder chamber, means for leading dough into said cylinder chamber, a vertical reciprocating sleeve having a bore therein adapted to communicate with said cylinder chamber, a head for cooperation with the lower end of said sleeve and adapted to control the extrusion of dough therefrom, the bore in said sleeve providing a continuous passageway between said cylinder chamber and said head through which dough travels during the extrusion of the same from the cutter.

9. A dough cutter comprising a cylinder having a vertical cylinder chamber open at its ends, valve means at the upper end of the cylinder for controlling the flow of dough into the cylinder chamber, an annular piston within said cylinder having a dough passageway therethrough movable wholly within said cylinder toward and from the upper end of said cylinder chamber, means for controlling the extrusion of dough therefrom and communicating with said cylinder chamber at a locality above said piston.

10. A dough cutter comprising a cylinder having a vertical cylinder chamber, an annular piston within said cylinder chamber, valve means for controlling the flow of dough into the upper end of said cylinder chamber, a sleeve within said annular piston forming a dough passageway therethrough and extending through the lower end of the piston and means cooperating with said sleeve for controlling the extrusion of dough from the lower end of said cylinder chamber.

11. A dough cutter comprising a cylinder having a vertical cylinder chamber, an annular piston within said cylinder chamber, valve means for controlling the flow into the upper end of said cylinder chamber, a sleeve within said annular piston and extending through the lower end of the same and means cooperating with said sleeve for controlling the extrusion of dough from the lower end of said cylinder chamber, and a tube within said sleeve and along which said sleeve slides, said tube conducting the dough to the lower end of the sleeve.

12. A dough cutter comprising a cylinder having a vertical cylinder chamber open at its ends, a support extending across the upper end of said cylinder and providing openings into the upper end of the cylinder chamber, a spindle attached to said support and extending downwardly through the lower end of the cylinder, an annular piston within said cylinder, a sleeve slidable within said piston and extending outwardly through the lower end of the cylinder and below said piston, a head on the lower end of said spindle adapted to control in conjunction with said sleeve the extrusion of dough from said cylinder chamber and valve means at the upper end of the cylinder chamber operated by said sleeve and controlling the flow of dough into said cylinder chamber, and a tube within said sleeve secured to said spindle and conducting dough from said cylinder chamber to the lower end of said sleeve.

13. A dough cutter comprising a hopper provided with a throat having at its lower end a discharge opening, means forming a dough chamber below said throat, and communicating with said hopper through said discharge opening, a valve seat at the lowermost portion of said throat and encircling said discharge opening, a poppet valve having a valve head adapted to seat against said seat, said valve head supporting the dough above said discharge opening, a valve controlled outlet communicating with said dough chamber and means creating a suction below said valve seat for drawing dough into said chamber through said opening, and for discharging it through said outlet.

14. A dough cutter comprising a hopper provided with a throat having at its lower end a discharge opening, means forming a dough chamber below said throat, and communicating with said hopper through said discharge opening, a valve seat at the lowermost portion of said throat and encircling said discharge opening, a poppet valve having a valve head adapted to seat against said seat, said valve head supporting the dough above said discharge opening, a valve controlled outlet communicating with said dough chamber and a piston below said valve seat for drawing dough into said chamber through said opening and for discharging it through said outlet, said piston being concentric with said valve head.

ALEXANDER S. T. LAGAARD.